United States Patent
Schliwa et al.

(10) Patent No.: US 10,597,160 B2
(45) Date of Patent: Mar. 24, 2020

(54) ARRANGEMENT WITH A PARTITIONING DEVICE IN A CABIN OF A VEHICLE AND AIRCRAFT WITH A CABIN AND SUCH AN ARRANGEMENT

(71) Applicant: Airbus Operations GmbH, Hamburg (DE)

(72) Inventors: Ralf Schliwa, Hamburg (DE); Eric Stuchly, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 295 days.

(21) Appl. No.: 15/494,051

(22) Filed: Apr. 21, 2017

(65) Prior Publication Data
US 2017/0225787 A1 Aug. 10, 2017

Related U.S. Application Data

(63) Continuation of application No. PCT/EP2015/074552, filed on Oct. 22, 2015.

(30) Foreign Application Priority Data

Oct. 23, 2014 (DE) .................. 10 2014 115 462

(51) Int. Cl.
*B64D 11/00* (2006.01)
*B64D 11/04* (2006.01)
(Continued)

(52) U.S. Cl.
CPC .......... *B64D 11/0023* (2013.01); *B64C 1/18* (2013.01); *B64D 11/00* (2013.01); *B64D 11/04* (2013.01); *B64D 11/0606* (2014.12); *B64C 1/066* (2013.01)

(58) Field of Classification Search
CPC .......... B64C 1/066; B64C 1/18; B64D 11/00; B64D 11/0023; B64D 11/04; B64D 11/0606
(Continued)

(56) References Cited

U.S. PATENT DOCUMENTS 2,396,039 A 3/1964 Burton et al.
5,577,348 A * 11/1996 Keller .................. E04B 2/827
160/40

(Continued)

FOREIGN PATENT DOCUMENTS

| EP | 2848526 A1 | 3/2015 |
|---|---|---|
| WO | 2012110643 A1 | 8/2012 |
| WO | 2014093545 A1 | 6/2014 |

OTHER PUBLICATIONS

International Searching Authority, International Search Report for International Application No. PCT/EP2015/074552 dated Dec. 16, 2015.

*Primary Examiner* — Claude J Brown
(74) *Attorney, Agent, or Firm* — Lorenz & Kopf LLP

(57) ABSTRACT

An arrangement in the cabin of a vehicle includes a floor, a first equipment component, a second equipment component and a partitioning device. The partitioning device is set up to provide a wall surface between the first equipment component and second equipment component largely perpendicular to the floor. The partitioning device is positionable in at least two positions along a length running between the first equipment component and second equipment component. The partitioning device is lockable in its respective position on at least one of the floor, a cabin ceiling and a cabin lining.

18 Claims, 8 Drawing Sheets

(51) Int. Cl.
*B64D 11/06* (2006.01)
*B64C 1/18* (2006.01)
*B64C 1/06* (2006.01)

(58) Field of Classification Search
USPC .................................................. 244/118.5
See application file for complete search history.

(56) References Cited

U.S. PATENT DOCUMENTS

| | | |
|---|---|---|
| 5,816,534 A | 10/1998 | Schumacher |
| 2013/0082140 A1 | 4/2013 | Ehlers et al. |
| 2013/0240163 A1* | 9/2013 | Mosler .................... B64C 1/066 |
| | | 160/238 |
| 2014/0224930 A1 | 8/2014 | Ivester et al. |
| 2015/0284082 A1* | 10/2015 | Mayer ................ B64D 11/0693 |
| | | 244/118.5 |

* cited by examiner

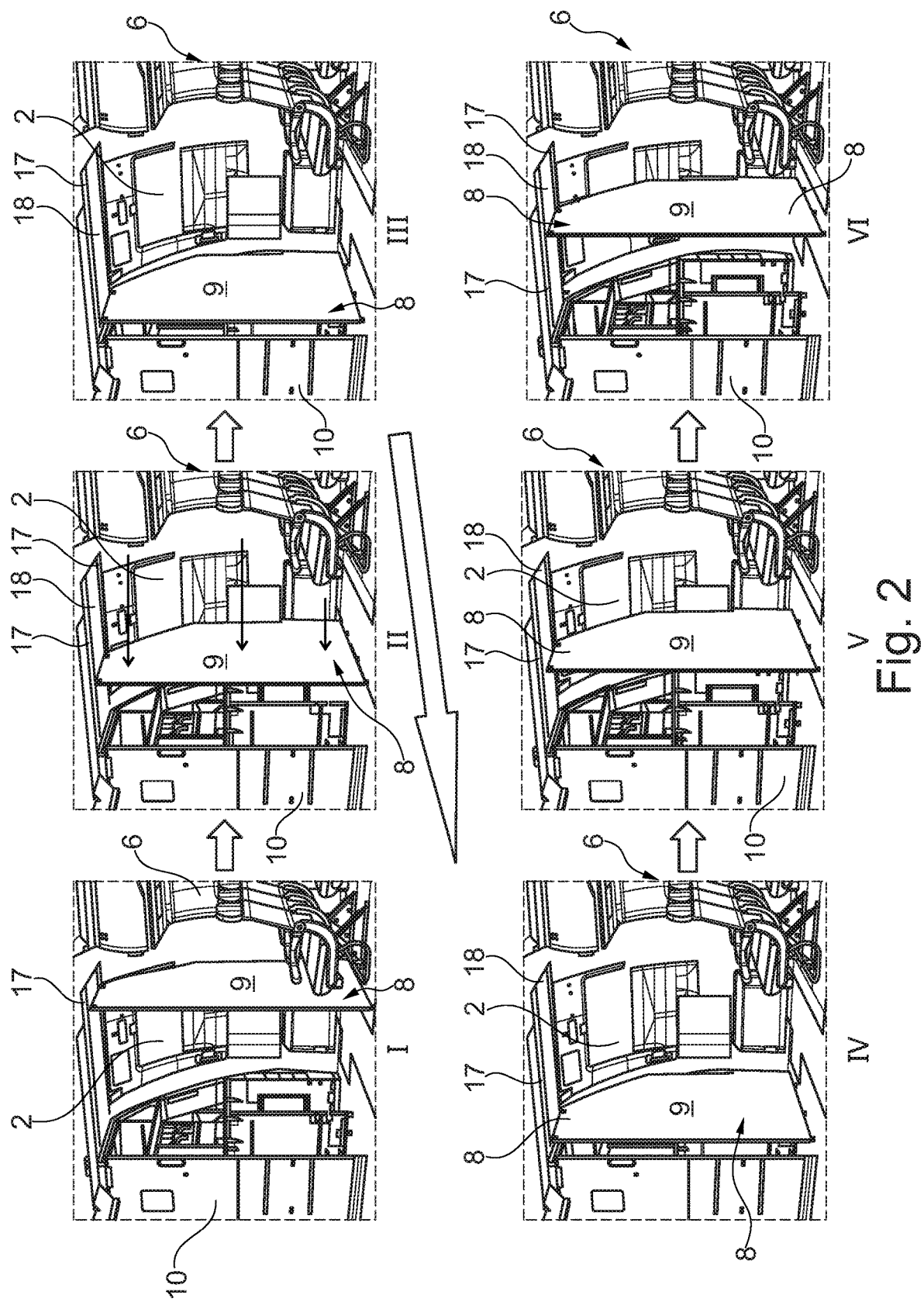

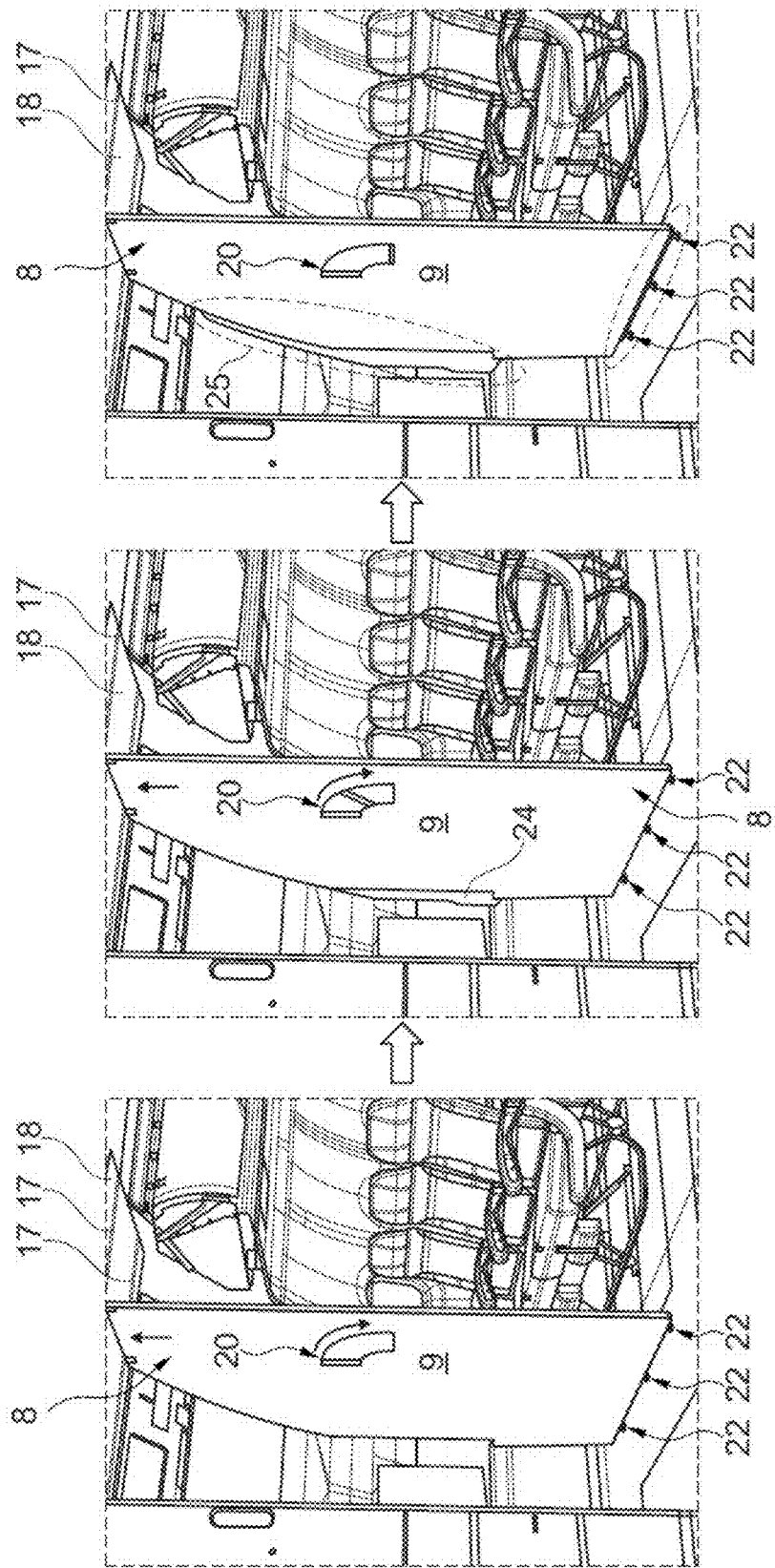

ARRANGEMENT WITH A PARTITIONING DEVICE IN A CABIN OF A VEHICLE AND AIRCRAFT WITH A CABIN AND SUCH AN ARRANGEMENT

CROSS-REFERENCE TO RELATED APPLICATION(S)

This application is a continuation of International Application No. PCT/EP2015/074552, having an international filing date of Oct. 22, 2015, which claims priority to German Application No. DE 10 2014 115 462.2, having a filing date of Oct. 23, 2014. Both of these referenced applications are incorporated by reference herein.

TECHNICAL FIELD

Embodiments of the invention relate to an arrangement in the cabin of a vehicle comprising a floor, a first equipment component and a second equipment component. The disclosed subject matter further relates to an aircraft comprising an aircraft fuselage incorporating a cabin that comprises such an arrangement.

BACKGROUND

The conception of cabins for vehicles and in particular for aircraft is subject to continuous optimization with regard to the efficient use of the installation space defined therein, so as to maximize the number of passenger seats that may be incorporated therein without limiting the comfort of passengers. For this purpose, cabin monuments often undergo structural improvements, so that they may provide as many functions as possible in the smallest possible space.

Known in the art is to fit cabin monuments with modules of varying types, which in particular encompass galley modules and toilet or washroom modules. Further known is to swivel-mount flight attendant seats onto a cabin monument, so that they only block access to a function of the monument when regulations do not allow its use anyway. Additionally known are toilet modules in aircraft cabins that may be expanded during flight into a door area, so that the space made available there may be utilized.

WO 2013/3017290 A1 shows an aircraft monument that comprises a sanitary module with a sanitary device along with a galley module situated adjacent to the sanitary module. The galley module encompasses a trolley storage room as well as a working surface. The trolley storage room is separated from the sanitary module by a partition wall.

BRIEF SUMMARY

The following disclosure provides a new or alternative arrangement in a cabin of a vehicle, which enables a further improved space utilization, in particular in a door area.

Certain advantages are achieved by an arrangement in the cabin of a vehicle, which comprises a floor, a first equipment component, a second equipment component, and a partitioning device. The partitioning device is set up to provide a wall surface between the first equipment component and second equipment component that is largely perpendicular to the floor. The partitioning wall may be positioned in at least two positions along a length running between the first equipment component and second equipment component. The partitioning device may further be locked in its respective position on at least one of the floor, a cabin ceiling and a cabin lining.

Therefore provided is a partitioning device that may be located in varying positions inside the cabin of the vehicle. This also includes positions that cannot be encumbered by permanent fixtures, especially pursuant to operating and licensing regulations governing the vehicle, and in particular aircraft.

The partitioning device is usable to create an optical or functional separation between two equipment components. Vehicle passengers are here afforded a certain level of privacy while staying between the first equipment device and partitioning device. On the other hand, specific operational phases of the vehicle allow using the partitioning device to functionally differentiate the first equipment component or the second equipment component or an area lying in between.

At this juncture, let the embodiment in a door area of an aircraft be mentioned in particular. The first equipment component could be a galley module or galley monument, while the second equipment component may be a passenger seat or a row of several passenger seats. The so-called door area may be situated over a length between the first equipment component and second equipment component, and adjoin a fuselage opening that may be sealed by an aircraft door. The partitioning device may be tightly abutted against the galley module for boarding, taxiing, takeoff and landing. This may be designated as a first operating mode. However, the partitioning device may be adjusted and positioned directly in the door area far enough away from the row of passenger seats during flight, which would be designated as a second operating mode. This ensures a smooth ground operation of the aircraft in the first operating mode, while emphasis is placed especially on the usability and optical screening of a galley area during the second operating mode. In this second operating mode, the partitioning device may thus assume a position that cannot be assumed by permanent fixtures. In a third operating mode, the partitioning device may be abutted as flush as possible against the row of passenger seats, so that the door area provides enough space in which objects, such as trolleys, may be moved into the cabin or out of the cabin.

The largely perpendicular wall surface between the first and second equipment component must be construed to mean that the wall surface extends in particular vertically inside of the cabin, i.e., vertically to the longitudinal axis of the aircraft fuselage or parallel to its vertical axis. For certain reasons, however, a partitioning device may also form a small angle with the vertical axis, e.g., up to 5°, which in the present examination must also be construed as being encompassed by the term "largely perpendicular".

If desired, the partitioning device may also be fastened at two or even more positions, which may also include an intermediate position in addition to the aforementioned extreme positions. The partitioning device fastener may vary depending on the selected type and configuration, as will be explained further below.

Different embodiments of the partitioning device will be presented below. Depending on the type and configuration, it may be necessary to not just latch the partitioning device to one location or edge inside of the cabin, but also to several areas or edges along the outer contour of the partitioning device. The embodiments of the invention are not confined to prescribing just one latching option.

The arrangement according to embodiments of the invention permits optimal use of the existing installation space, in particular in the door area and on other exposed areas inside of the cabin, since a displaceable partitioning device enables the selective use of an especially large area of the cabin, but one that is not available in all operating phases of the vehicle.

In an advantageous embodiment, the partitioning device comprises a guiding device and a dimensionally stable partition wall guided therein. The partitioning device is thus actually realized as a wall-like component, which may be designed as a conventional, fixed partition wall, for example. It is especially advantageous for the guiding device to be a linear guiding device, which permits displacing the partitioning wall over a linear stretch between the two equipment components. Depending on the cabin configuration, however, it may also be advantageous to use a non-linear guiding device in the respective area, thereby also allowing for a displaceability in the transverse direction to go along with the displaceability in particular in the longitudinal direction of the cabin, wherein the movements in the longitudinal and transverse direction are coupled with each other by the progression of the guiding device. At least sections of the guiding device may here be arranged parallel to the longitudinal direction of the cabin, and alternatively inclined relative thereto as well.

In an advantageous embodiment, the guiding device is arranged on the cabin ceiling, and extends over the at least two positions. The guiding device may be fastened to a frame structure, to which a cabin ceiling lining is also secured. This enables a reliable, durable and fixed bonding of the guiding device.

The guiding device may be adjusted so as to have two or more rails running parallel to each other, on which sliders are slide-mounted. The sliders are either flat, oblong, square or otherwise shaped bodies made out of a material or comprising a coating comprised of a material that has a low static friction. One advantageous alternative involves sliders that comprise rollers, which may roll along the guiding direction in a space provided inside of the rails. In particular for applications in an aircraft, it may be advantageous to use several sliders spaced apart from each other in the guiding direction or a slider with an oblong extension or a slider with several rollers, wherein the slider(s) is/are connected with a mounting bracket, which is in turn swivelably or rigidly joined with the partition wall to be guided. The risk of jamming is reduced in particular by using several sliders distributed along the running direction of the guiding device.

An especially advantageous embodiment comprises a locking mechanism with at least one support foot that may be brought into contact with the floor, and may move in a vertical direction relative to the partition wall to lift or lower the partition wall. Operating and licensing regulations governing aircraft in particular require that a partition wall be held reliably and securely in its installation position. Latching just with a guiding rail might be inadequate, or the guiding rail and/or slider guided thereon would be too voluminous, too heavy and too cost intensive to manufacture. By contrast, the locking mechanism with support feet is mechanically very easy to operate, for example by using a large lever arm within a lever mechanism to initiate a relatively slight movement of the support feet, which by virtue of contacting the cabin floor inevitably causes the partition wall to be lifted. As a consequence, once the support feet have traversed a specific distance, the upper edge of the partition wall nestles against the guiding device located above it, thereby clamping the partition wall between the cabin floor and cabin ceiling. The locking mechanism may conceivably be outfitted with a lever mechanism in which a dead point is exceeded shortly before an operating lever reaches an end position, causing the partition wall to be very reliably clamped, since the latter may only be released by swiveling back the operating lever, but not by exerting a force on the support feet.

An especially advantageous embodiment comprises a wall element that is movable at least in the horizontal direction relative to the partition wall in order to selectively alter a surface spanned by an outer contour of the partitioning device. In the dimensionally stable, stiff form described above, the partition wall may be very readily slid into the cabin and latched, but the fixed structure of the partitioning device makes it impossible to adjust its outer contour given an installation space that variably expands laterally along the possible displacement length. The displaceable wall element may be used to selectively vary the outer contour by retracting or inserting the wall element to a specific extent in specific positions.

The wall element may be moved by taking a variety of measures. For example, a separate actuating element coupled with the wall element may be used, which, once a specific position of the partition wall has been reached, may be actuated before or after it has been latched. As an alternative, an operating element for the locking mechanism of the partition wall may conceivably also be combined with a corresponding lever mechanism of the displaceable wall element. As a consequence, the outer contour of the partition wall may be adjusted by displacing the wall element, depending on the latching state. In such a case, it may conceivably be ensured that the surface spanned by the outer contour be kept as small as possible due to an inserted state of the wall element with the locking mechanism released, so that the partition wall may be displaced along the displacement length without colliding with fixtures. When activating the locking mechanism, a spring tensioned by the actuating element may be used to exert a corresponding force on the wall element, so that the latter nestles against the encountered contour of the cabin, depending on the installation space locally available. Using the spring mechanism makes it possible to consider different available widths without fixtures in the cabin becoming damaged.

An outwardly directed edge of the wall element may comprise a flexible sealing element, which may be compressed, and allows the wall element to lie flush against an inner contour of the cabin.

It may be advantageous that the wall element is latchable into at least one extended position. In particular if the wall element is movable by a separate actuating element, it makes sense to latch it in a desired position. As a consequence, undesired noises may be reduced in the event of vibrations during vehicle operation, so that this by no means limits the comfort of the passengers. On the other hand, the wall element may be latched even when forcedly guiding the wall element and using the spring mechanism while latching the partition wall, for example by clamping the wall element once an end position of the actuating lever or the like has been reached. Clamping may permit a very much position-variable latching.

In a particularly advantageous embodiment, the partition wall comprises two main surfaces that are parallel to each other and define the extension of the partition wall, wherein the wall element is displaceably mounted between the main surfaces. Defined as main surfaces are those surfaces of the partition wall that comprise the largest extension, and whose outer contours may be perceived especially in the transverse direction of the cabin. In order to achieve a sufficient stiffness or strength, the partition wall comprises a specific material thickness, wherein the latter may be realized with varying means. In particular during use in an aircraft, it makes sense for reasons of weight to use a honeycomb structure encased between two cover layers that each form a wall surface. Such a partition wall may also comprise a recess in places, wherein the displaceable wall element is guided in this recess. In order to preserve the required stiffness, the recess may be fitted with additional material layers on the interior sides of the wall surface, for example in the form of reinforcing layers made out of a fiber-reinforced plastic. Alternatively or additionally, it also makes sense to use in particular a metal layer, for example consisting of an aluminum alloy. This gives the partition wall a very harmonious external appearance, since the wall element does not have to be guided on any of the visible wall surfaces, and no bulge or projection is required to clad the wall element. Consequently, the actuating mechanism for the wall element may also be arranged inside of the partition wall, which further increases the reliability and safety of the arrangement.

As an alternative to using a fixed partition wall, the partitioning device may also comprise a dimensionally flexible, flat web that may be rolled or folded around at least one direction in space, so as to clamp the wall surface. Consequently, the partitioning device may be removed by rolling it up or folding it together, so that a dedicated guiding device is not necessary. However, it must be ensured given such a non-dimensionally stable partitioning device that, once in a rolled out or unfolded state, this state is also maintained.

Such a partitioning device may preferably also comprise a receptacle for holding the folded together or rolled up web. The receptacle may be secured to at least one of the floor, cabin ceiling or cabin lining. The receptacle does not absolutely have to be a closed container, but rather also be an open or frame-like container, which is suitable for preferably completely accommodating the web in a compacted state. The ability to assume various positions inside of the cabin allows a particularly easy adjustment to a respective phase of aircraft operation, specifically by detaching the receptacle from its current position and then reattaching it again at another desired position. A tool-free, manually actuated fastener is especially suited for this purpose, so that a traveling or flight attendant requires only a few hand movements to adjust the desired position of the partitioning device.

In an advantageous embodiment, the arrangement comprises at least one first connecting device, which may be fastened to at least one of the floor, cabin ceiling or cabin lining, and corresponds with at least one second connecting device situated on the web, wherein the at least one first connecting device and at least one second connecting device are set up to tautly clamp the web. Depending on the type and configuration of the web, the connecting devices may be differently conceived, for example comprise only hooks and eyelets. Also conceivable as an alternative are pushbutton, Velcro, magnet or screw fasteners. The connecting devices must here be distributed over the outer contour of the web in such a way as to ensure a durably taut, flat shape for the web.

Let it be noted at this juncture that in particular the floor, and optionally the cabin ceiling and/or cabin lining, may preferably be configured in such a way as to minimize the visibility and noticeability of both depressions and projections when one or more of the fastening points serving to accommodate the partitioning device are not in use, so as to not detract from the harmonious look of the cabin and to prevent any accidents.

In another equally advantageous embodiment, the partitioning device may comprise a dividing curtain with at least one curtain element and a curtain rail. The curtain rail may be fastened to at least two positions of the cabin ceiling. Similarly to the partitioning device with the flat web described above, the dividing curtain may be guided on the curtain rail, wherein the curtain rail may in turn be fastened to several positions, so that the curtain element hangs from the cabin ceiling to the floor at the desired location. The curtain rail may be situated essentially transverse to the longitudinal direction of the cabin.

In order to hold the curtain element in a folded together state, it may be advantageous to have a retaining device, for example which is located at the first equipment component.

The first equipment component may be a cabin monument, which may encompass an entire series of different cabin monuments. In particular, the latter may encompass galley modules, toilet modules, relaxation rooms, washrooms and the like. However, one especially advantageous use for the partitioning device involves a galley or toilet module.

In an advantageous embodiment, the second equipment component comprises at least one passenger seat. The second equipment component may likewise also comprise a row of passenger seats with two, three, four or more passenger seats. As a consequence, the partitioning device provides an optical and functional separation between the passenger seats and the first equipment component. During certain operational and flight phases, the partitioning device may be situated in an area spaced far enough apart from the passenger seats, while still allowing use of the first cabin equipment component.

In another embodiment, the first equipment component and the second equipment component enclose a door area of the cabin, wherein the partitioning device is tightly abuttable against the first equipment module in a first operating mode and positionable directly in the door area at a distance to the first equipment component and the second equipment component in a second operating mode. As mentioned above this allows to provide a temporary working space in the door area, which remains unused during operation of the vehicle, e.g. during flight if the vehicle is an aircraft. It is conceivable to additionally provide a separation curtain extending from an edge of the partitioning space, which is opposite from the door, to the first equipment module to even temporarily provide a certain degree of privacy for cabin personnel without blocking any installation for passengers.

This embodiment may be further be modified in that the first equipment module is a galley module and in that the partitioning device is placeable at a distance to the galley module that allows removing or inserting cabin trolleys from or into the galley module. The galley module may comprise a front, which may face to the second equipment component, such that cabin trolleys may easily be moved into or out of dedicated trolley parking spaces from or onto an aisle, or through an access opening of the vehicle facing into the door area. The front of the galley module and the access opening may be arranged directly adjacent to each other and/or adjoin adjacent edges of the door area. The available space in the door area not only allows to move the cabin trolleys but may also be used for temporarily parking cabin trolleys outside the galley module for meal preparation. In this regard it is to be understood that the cabin trolleys may include full size trolleys and half size trolleys, depending on the available space in the galley module or the individual requirements of the vehicle operator.

Finally, certain embodiments of the invention relate to an aircraft comprising an aircraft fuselage with a cabin formed therein, which comprises an arrangement with the features mentioned above. In particular, the first cabin equipment component and second cabin equipment component are situated in or adjacent to a door area, wherein the partitioning device may be latched at least in a position lying in the door area.

Of course, the embodiments of the invention are not limited to using only one of these arrangements in the cabin of an aircraft. Rather, it makes sense to integrate several such arrangements into a cabin. In particular, this may imply having each of the several doors in an aircraft cabin be fitted with such an arrangement.

In like measure, let it be noted that the arrangement itself is not confined to the door area, but may be used at such locations inside of a cabin where two preferably different equipment components are situated opposite each other. In addition, the equipment components may also be identical, so that the partitioning device may also function as a partition wall between various cabin or seat classes, if both equipment components are configured as passenger seat arrangements. In addition, a partitioning device may also be situated in the area of emergency exits as an option for creating a private sphere and shunting area for patient transfer, as a separation between aisle areas in front of toilet modules for passengers with restricted mobility, in front of relaxation rooms for pilots and cabin personnel, as well as in front of the cockpit door.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Additional features, advantages and possible applications for embodiments of the present invention may be gleaned from the following description of the exemplary embodiments and the figures. In addition, identical reference numbers on the figures stand for the same or similar objects.

FIG. 2 shows a sequence of steps for repositioning a partitioning device in six partial figures (I to VI).

FIGS. 3a to 3h show a dimensionally stable, stiff partitioning device in several two- or three-dimensional views.

DETAILED DESCRIPTION

Figure 1A:
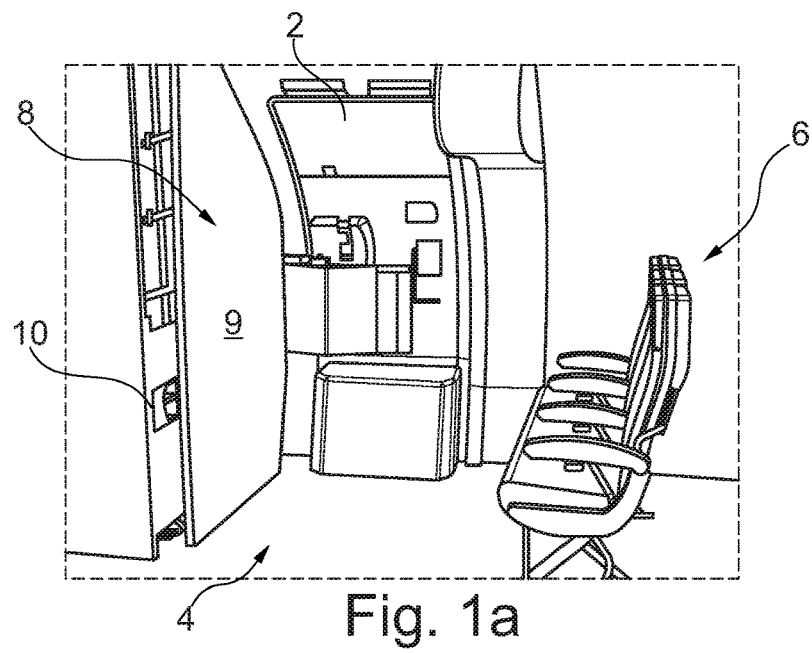
FIG. 1a to 1c show a door area with an arrangement according to an embodiment of the invention in three-dimensional views (FIGS. 1a and 1b) and a top view (FIG. 1c).
Figure 1B:
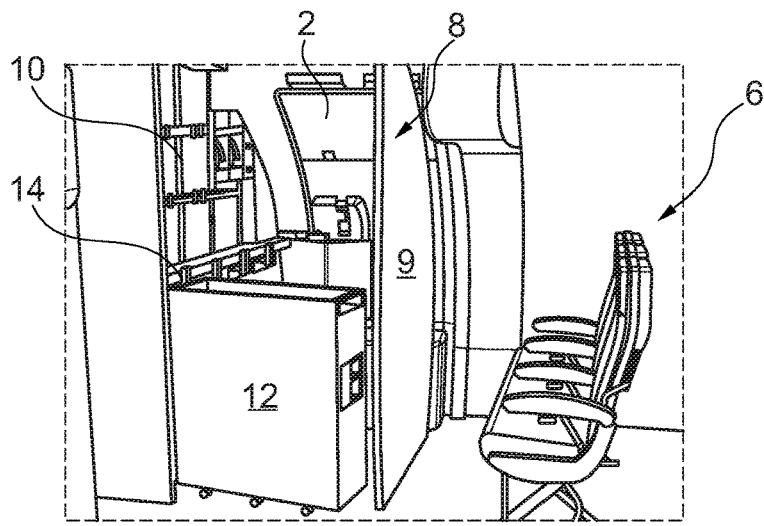
Figure 1C:
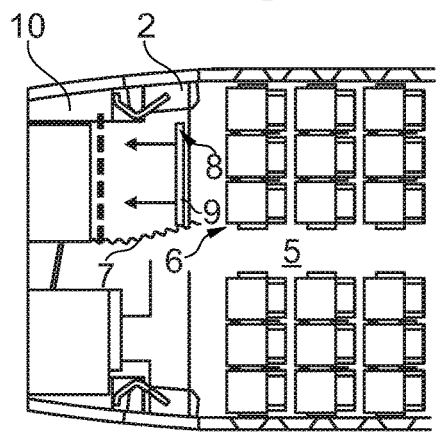

FIG. 1a to 1c show a door area according to a first exemplary embodiment of the invention. The depiction shows a door area in an aircraft cabin with an opening sealed by a door 2 and adjoining a floor 4, on which is positioned a passenger seat arrangement 6 pointed toward a partitioning device 8.

On FIG. 1a, the partitioning device 8 comprises a dimensionally stable, stiff partitioning wall 9, which is situated between the door 2 and an aircraft galley 10 as a first equipment component, which is placed opposite the passenger seat arrangement 6 serving as a second equipment component within the meaning of the preceding description.

In this exemplary embodiment, the partitioning device 8 is placed flush or largely flush against the aircraft galley 10, and thus provides a prescribed emergency escape route from the cabin to the outside. This position of the partitioning device 8 is provided in particular for boarding, taxiing, takeoff and landing and may correspond to the above mentioned first operating mode.

On FIG. 1b, the partitioning device 8 is shifted from the galley 10 to the passenger seat group 6, so that it is positioned in the door area in front of the door 2, and clears the way to the galley 10. Shown as an example is a trolley 12, which has been pulled out of a corresponding storage room 14 of the aircraft galley 10, or is in the process of being pushed into the storage room 14. While the distance between the aircraft galley 10 and partitioning device 8 does end up blocking the emergency escape route in front of the door 2, the latter is irrelevant during cruising flight, so that the displaceable partitioning device 8 enables the logical use of a space that remains unused while in flight, which ends up tangibly increasing the space utilization on board the aircraft. Further, location of the partitioning device 8 of FIG. 1b, which may correspond to the above mentioned second operating mode, leaves enough leg room for passengers on the directly adjacent passenger seat arrangement 6. The available distance in the door area, inter alia determined by the width of the door 2, allows to insert or remove trolleys 12 as shown.

FIG. 1c shows a top view of this exemplary embodiment, in which the movable partitioning device 8 is depicted in the two positions from FIGS. 1a and 1b. As evident from this illustration, the aircraft galley 10 and passenger seat group 6 may be situated very closely against the door 2. As apparent in this view cabin trolleys 12 may easily be moved into an aisle 5 between passenger rows 6 from the galley 10 when the partitioning device 8 is in the second operating mode.

Further, the partitioning device 8 may also hold a privacy curtain 7, which extends from an edge opposite from the door 2 to the galley 10, which allows cabin personnel to temporarily rest and relax without being disturbed by passengers and without blocking any installations for passengers.

FIG. 2 shows a chronological progression of several steps, which are marked with Roman numerals I to VI, and denoted with partial figures below. The partial FIG. 1 presents the partitioning device 8 spaced a maximum possible distance from the aircraft galley 10, so that the partitioning device 8 abuts flush against the passenger seat group 6. This provides the largest possible space in the door area, which translates in particular into a simplified ground service, in that the aircraft galley 10 is evacuated and/or outfitted, which in particular also involves taking out and putting in trolleys 12. In the preceding depiction, this is referred to as the third operating mode.

On partial figure II, the partitioning device 8 is half way to the aircraft galley 10, wherein the partitioning device 8 is to this end guided on two guide rails 17 arranged parallel to each other as the guiding device, for example, which are arranged flush in a cabin ceiling 18 and run in the longitudinal direction of the cabin.

On partial figure III, the partitioning device 8 is already in a position corresponding to the position on FIG. 1a. The aircraft galley 10 is here covered, and the partitioning device 8 is spaced the smallest possible distance from the aircraft galley 10. This allows the aircraft to be boarded, since the maximum space is provided in the door area in front of the aircraft door 2. An optical and functional separation of the aircraft galley 10 is achieved. In the preceding illustration, this is referred to as the first operating mode.

On the ensuing partial figure IV, the position of the partitioning device 8 is unchanged by comparison to partial figure III, which would correspond to the taxiing, takeoff and landing phases of operation.

On partial figure V, the partitioning device is moved away from the galley 10, and approaches the passenger seat group 6 until a position in front of the passenger seat group 6 visible on partial figure VI has been reached. This allows the cabin personnel to access the aircraft galley 10, remove trolleys 12 from parking places or push them into the latter, or reach other storage compartments with mechanisms that may and cannot be electrically operated. This is labeled as the second operating mode in the preceding depiction.

When using a dimensionally stable, stiff, plate-shaped element, i.e., a partition wall 9, in a partitioning device 8, a reliable locking in a desired position must be ensured. FIGS. 3a to 3h show various mechanisms of such a partitioning device 8, which enable both displacement and locking, along with covering the largest possible area with the partitioning device 8.

FIG. 3a shows a partitioning device 16, which comprises a dimensionally stable, stiff partition wall 9 that is displaceably mounted on guide rails 17 situated in the cabin ceiling 18. For example, the partitioning device 8 comprises a handle 20 that may be moved between a first and second position, so as to lock or release the partitioning device 8 by means of a locking mechanism not depicted in any detail. For example, the partitioning device 8 on FIG. 3a is in a lockable position, in which support feet 22 arranged on an edge of the partitioning device 8 opposite the cabin ceiling 18 are retracted. After operating the handle 20 shown on FIG. 3c, the partitioning device 8 is locked, and the support feet 22 are in an extended position, so that the partitioning device 8 becomes clamped in the cabin.

FIG. 3b shows an additional wall element 24, which may be laterally displaced relative to the partitioning device 8. In this conjunction, the lateral direction is to be regarded as a displacement parallel to the extension plane of the partitioning device 8. The wall element 24 may be selectively displaced laterally toward the outside, so as to enable a locally improved coverage of a cross sectional area 25, into which the partitioning device 8 does not protrude after displaced to a desired longitudinal position. This may be achieved by actuating the handle 20, for example parallel to the displacement of the feet 22. A lever mechanism conceived in the partitioning device 8 may be provided for this purpose.

Figure 3D:
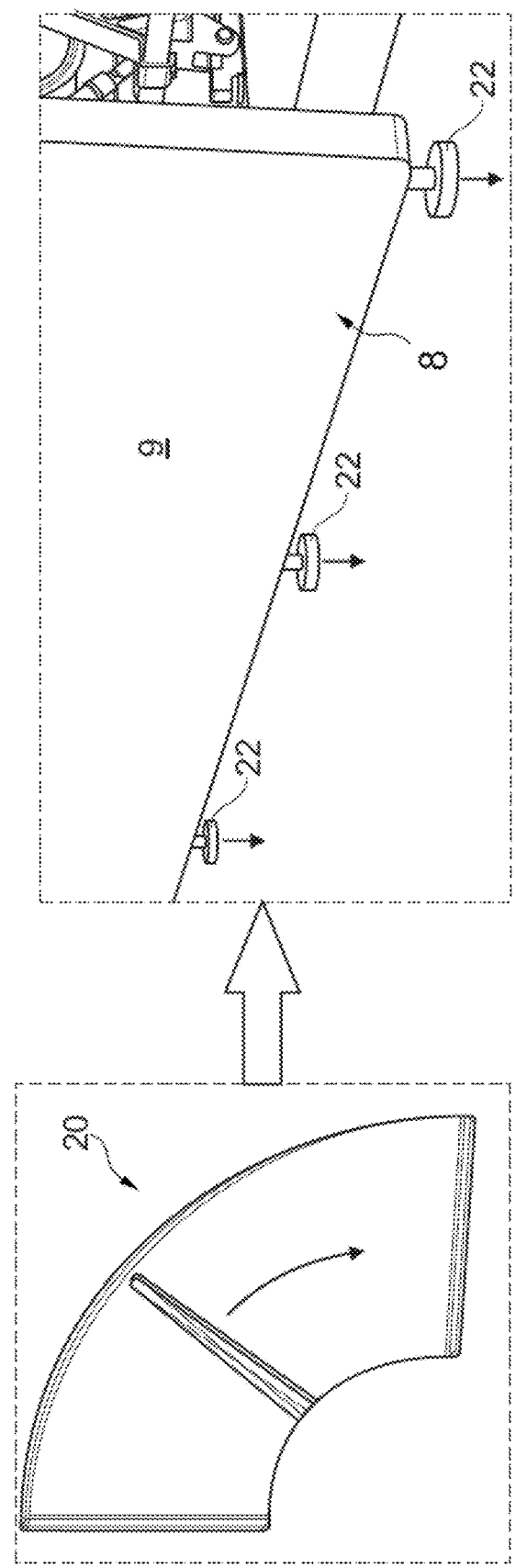

FIG. 3d presents schematic views of the support feet 22, which may be extended out of the partitioning device 8 based on a movement of the handle 20. In an extended position, the support feet 22 contact the floor, and as they continue to be extended, press the partitioning device 8 upward from the floor, where the partitioning device 8 is pressed against the guide rails 17, establishing a clamp between the floor and guide rails 17 to maintain the position. The cabin ceiling 18 may conceivably comprise depressions at certain locations, into which the partitioning device 8 may be introduced by extending the support feet 22.

Parallel thereto, the guide rail 17 could comprise light latching steps, which the partitioning wall 9 gets into via displacement, but may there be easily detached again. In this way, haptic feedback may be obtained about having reached a predetermined position.

Figure 3E:
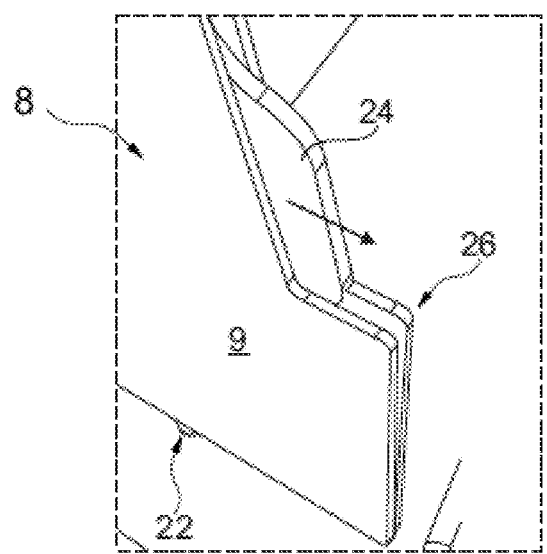
Figure 3F:
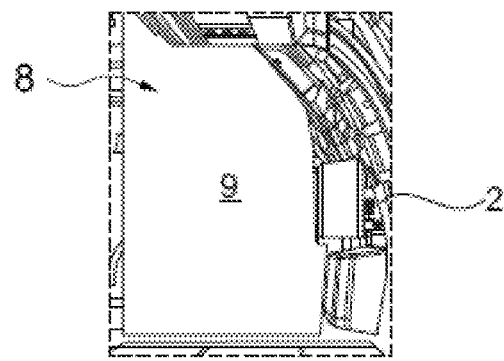
Figure 3G:
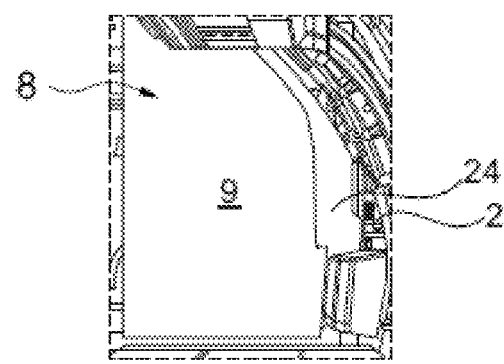

FIGS. 3e to 3g further present the displaceable wall element 24 in a divergent illustration. As made evident here, the partitioning device 8 comprises a depression 26 into which the displaceable wall element 24 is guided. The wall element may be moved out of the depression 26 toward the outside by actuating the handle 20, so that the extended position shown on FIG. 3g is reached from a retracted position shown on FIG. 3f. In addition to the wall element 24, rubber lips or the like may be used, thereby allowing the wall element 24 to abut flush against a provided contour in the fuselage.

Figure 3H:
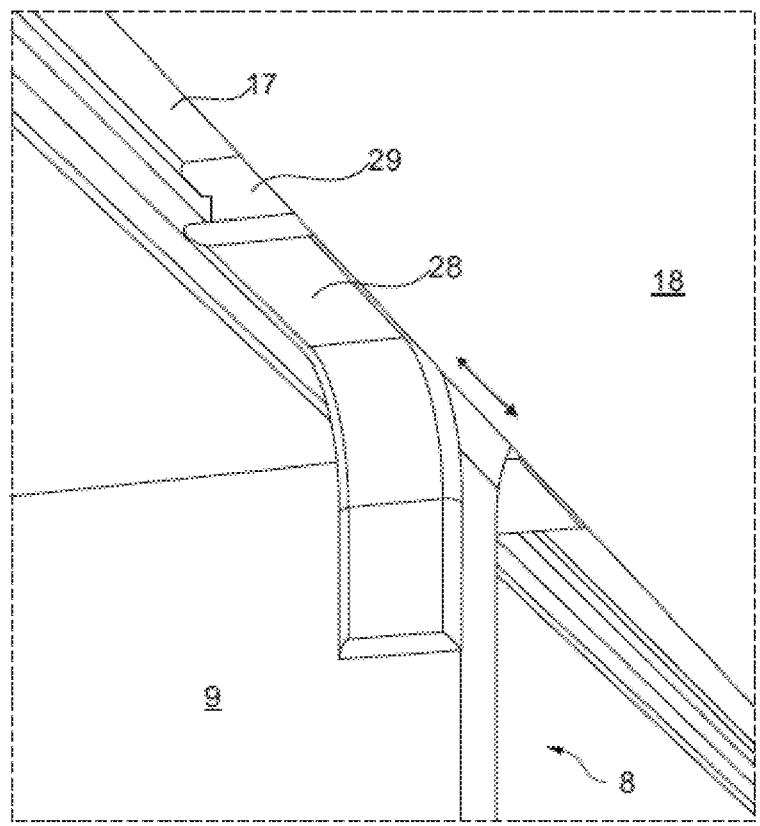

Finally, FIG. 3h presents a detailed view of a guide rail 17 situated in a cabin ceiling 18, which guides a slider 29 with a mount 28 that at least partially carries the partition wall 9.

Figure 4A:
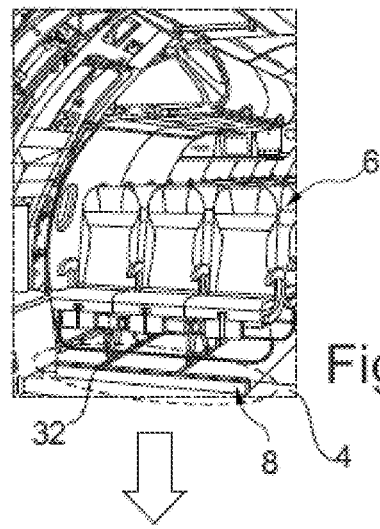
FIGS. 4a to 4c show a foldable or rollable partitioning device in different extended states.
Figure 4B:
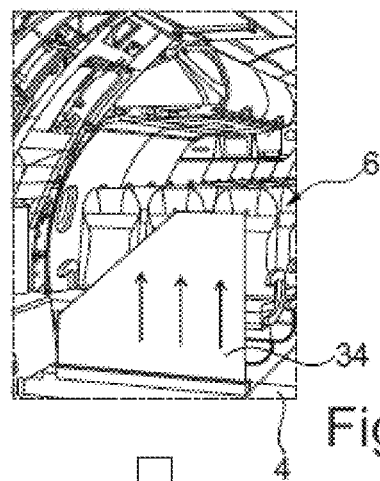
Figure 4C:
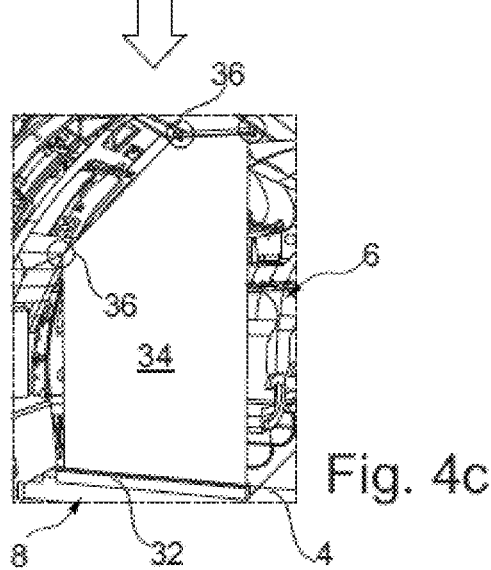

Shown in another advantageous exemplary embodiment in FIGS. 4a, 4b and 4c is a partitioning device 8, which comprises a receptacle 32 that incorporates a rolled-up, flat dividing element 34, such as a web. The receptacle 32 may be positioned at a desired location within the cabin, so that the dividing element 34 may be pulled out of the receptacle 32 after the latter has been locked in place. The dividing element 34 may then be secured to several locking mechanisms 36, i.e., first connecting devices 36, thereby yielding a flat partition wall. To this end, correspondingly designed second connecting devices on the web 34 are joined with the first connecting devices 36. Instead of displacing a partitioning device with a dimensionally stable configuration, various positions may thus be achieved by removing and introducing the receptacle 32.

Figure 5A:
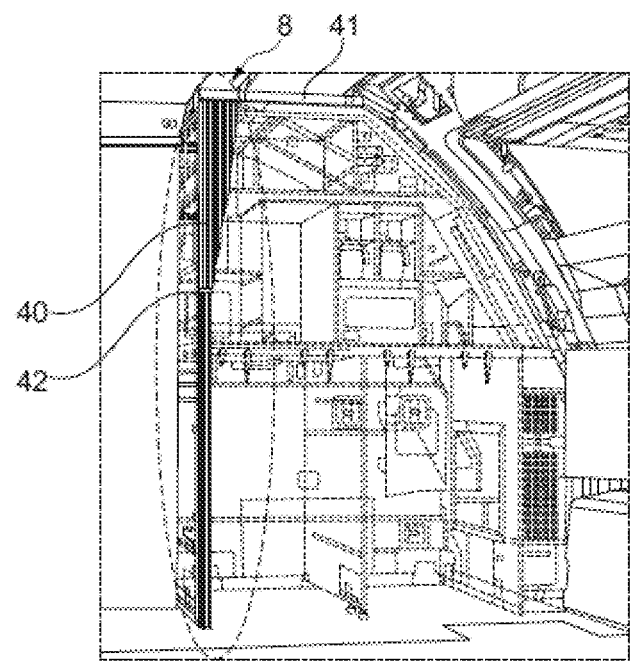
FIGS. 5a and 5b show a partitioning device that comprises a curtain.
Figure 5B:
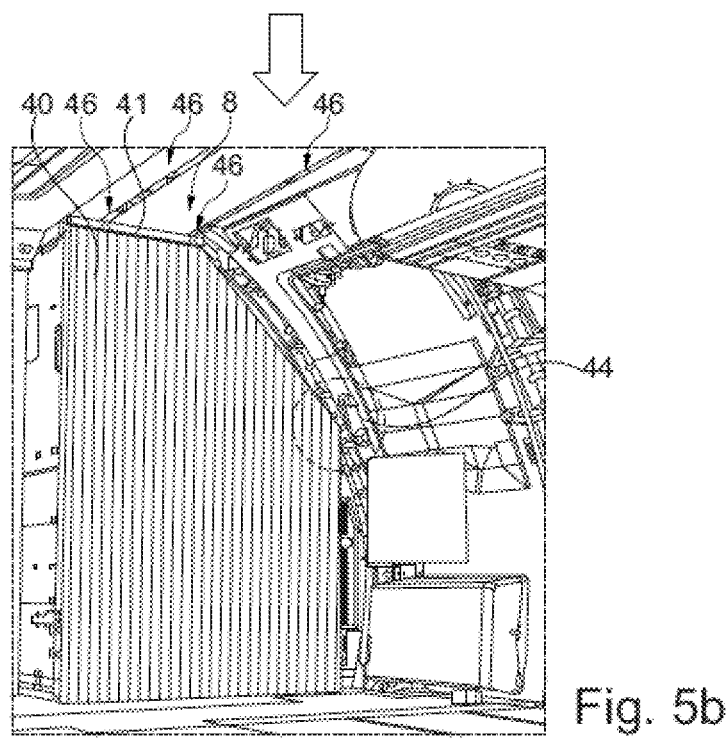

FIGS. 5a and 5b further show a partitioning device 8 consisting of a curtain 40, a curtain rail 41 and locking mechanisms 42. The curtain 40 may here be lashed back with the locking mechanisms 42, so that the aircraft galley 10 is accessible. If a cover is desired, the curtain 40 may be released from its lashed position, and fastened to another locking mechanism 44 on a cabin lining. The cabin ceiling 18 may comprise various discrete attachment points 46 for fastening the curtain rail 41. As an alternative, the curtain rail 41 may also be fixed in guide rails 17 from the preceding illustrations, or the attachment points 46 may be secured to the guide rails 17 themselves.

In addition, let it be noted that "comprising" does not preclude any other elements or steps, and that "a" or "an" does not rule out a plurality. Let it further be noted that features described with reference to one of the above exemplary embodiments may also be used in combination with other features of other exemplary embodiments described above. Reference numbers in the claims are not to be construed as a limitation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An arrangement for a cabin of a vehicle, comprising:
    a floor having a primary region and a secondary region separated by an aisle;
    a first equipment component located in the primary region;

a second equipment component located in the primary region; and a partitioning device located in the primary region and terminating at the aisle;

wherein the partitioning device is set up to provide a wall surface between the first equipment component and the second equipment component substantially perpendicular to the floor;

wherein the partitioning device is positionable in at least two positions along a length running between the first equipment component and the second equipment component;

wherein the partitioning device is lockable in its respective position on at least one of the floor, a cabin ceiling, and a cabin lining;

wherein the partitioning device comprises a guiding device and a dimensionally stable partition wall guided therein; and wherein the guiding device is arranged on the cabin ceiling, and extends over the at least two positions.

2. The arrangement of claim 1, wherein the first equipment component is a cabin monument.

3. The arrangement of claim 1, wherein the floor includes a carpeted upper surface, and wherein the arrangement further comprises a locking mechanism with at least one support foot configured to be extended downward into contact with the carpeted upper surface of the floor, and wherein the at least one support foot is movable in a vertical direction relative to the partition wall to lift or lower the partition wall.

4. An arrangement for a cabin of a vehicle, comprising:
a floor having a primary region and a secondary region separated by an aisle;
a first equipment component located in the primary region;
a second equipment component located in the primary region;
a partitioning device located in the primary region and terminating at the aisle; and
a locking mechanism with at least one support foot configured to be extended downward into contact with an uppermost surface of the floor, and wherein the at least one support foot is movable in a vertical direction relative to the partition wall to lift or lower the partition wall;
wherein the partitioning device is set up to provide a wall surface between the first equipment component and the second equipment component substantially perpendicular to the floor;
wherein the partitioning device is positionable in at least two positions along a length running between the first equipment component and the second equipment component;
wherein the partitioning device is lockable in its respective position on at least one of the floor, a cabin ceiling, and a cabin lining; and
wherein the partitioning device comprises a guiding device and a dimensionally stable partition wall guided therein.

5. An arrangement for a cabin of a vehicle, comprising:
a floor having a primary region and a secondary region separated by an aisle;
a first equipment component located in the primary region;
a second equipment component located in the primary region; and a partitioning device located in the primary region and terminating at the aisle;
wherein the partitioning device is set up to provide a wall surface between the first equipment component and the second equipment component substantially perpendicular to the floor;
wherein the partitioning device is positionable in at least two positions along a length running between the first equipment component and the second equipment component;
wherein the partitioning device is lockable in its respective position on at least one of the floor, a cabin ceiling, and a cabin lining;
wherein the partitioning device comprises a guiding device and a dimensionally stable partition wall guided therein,
wherein the floor has an upper surface that defines a horizontal plane, wherein the partition wall has a first main surface that defines a vertical plane perpendicular to the horizontal plane, and wherein the horizontal plane and the vertical plane intersect at a line, and
wherein the partitioning device further comprises an additional wall element configured to slide in a lateral direction co-linear with or parallel to the line relative to the partition wall in order to selectively alter an area spanned by an outer contour of the partitioning device.

6. The arrangement of claim 5, further comprising:
a locking mechanism with at least one support foot configured to be extended downward into contact with the floor, and
a handle operatively connected to the locking mechanism and to the additional wall element such that movement of the handle from an unlocked orientation to a locked orientation actuates extension of the at least one support foot downward into contact with the floor and extension of the additional wall element in the lateral direction to increase the area spanned by the outer contour of the partitioning device.

7. The arrangement of claim 5, wherein the partition wall further comprises a second main surface parallel to the first main surface, and wherein the wall element is displaceably mounted between the main surfaces and configured to slide in the lateral direction between a retracted orientation within the partition wall to an extended configuration.

8. An arrangement for a cabin of a vehicle, comprising:
a floor having a primary region and a secondary region separated by an aisle;
a first equipment component located in the primary region;
a second equipment component located in the primary region; and
a partitioning device located in the primary region and terminating at the aisle;
wherein the partitioning device is set up to provide a wall surface between the first equipment component and the second equipment component substantially perpendicular to the floor;
wherein the partitioning device is positionable in at least two positions along a length running between the first equipment component and the second equipment component; and
wherein the partitioning device comprises a receptacle positionable on the floor at least two positions and a dimensionally flexible, flat web that is rollable about an axis in the receptacle, wherein an unrolled end of the web is configured to extend in a vertical direction, and wherein the arrangement further comprises a locking mechanism located on the cabin ceiling and configured to engage the unrolled end of the web.

9. An arrangement for a cabin of a vehicle, comprising:
a floor having a primary region and a secondary region separated by an aisle;
a first equipment component located in the primary region;
a second equipment component located in the primary region; and
a partitioning device located in the primary region and terminating at the aisle;
wherein the partitioning device is set up to provide a wall surface between the first equipment component and the second equipment component substantially perpendicular to the floor;
wherein the partitioning device is positionable in at least two positions along a length running between the first equipment component and the second equipment component and wherein the partitioning device is configured to be locked in its respective position only through a pressure fit engagement with the floor.

10. An arrangement for a cabin of a vehicle, comprising:
a floor having a primary region and a secondary region separated by an aisle;
a first equipment component located in the primary region;
a second equipment component located in the primary region; and
a partitioning device located in the primary region and terminating at the aisle;
wherein the partitioning device is set up to provide a wall surface between the first equipment component and the second equipment component substantially perpendicular to the floor;
wherein the partitioning device is positionable in at least two positions along a length running between the first equipment component and the second equipment component; and
wherein the partitioning device comprises a curtain with a curtain rail, and wherein the curtain rail is positionable at the at least two positions along the length running between the first equipment component and the second equipment component and lockable to the cabin ceiling.

11. An arrangement for a cabin of a vehicle, comprising:
a floor;
a first equipment component;
a second equipment component, wherein the first equipment component and the second equipment component enclose a door area of the cabin, such that a door to the cabin is located between the first equipment component and the second equipment component; and
a partitioning device;
wherein the partitioning device is set up to provide a wall surface between the first equipment component and the second equipment component substantially perpendicular to the floor;
wherein the partitioning device is positionable in at least three positions along a length running between the first equipment component and the second equipment component; and
wherein the partitioning device is lockable in its respective position on at least one of the floor, a cabin ceiling, and a cabin lining, and wherein the partitioning device is configured to be locked in a forwardmost position between the first equipment module and the door and abutting against the first equipment module in a first operating mode, configured to be locked in an intermediate position directly in the door area and blocking access to the door in a second operating mode, and configured to be locked in a rearmost position between the second equipment module and the door.

12. The arrangement of claim 11, wherein the first equipment module is a galley module, and wherein, in the intermediate position, the partitioning device is sufficiently distanced from the galley module to form an access for removing or inserting cabin trolleys from or into the galley module.

13. The arrangement of claim 11, wherein the second equipment component comprises at least one passenger seat.

14. An aircraft comprising:
an aircraft fuselage;
a cabin formed in the aircraft fuselage;
a door to the cabin; and
an arrangement in the cabin, the arrangement comprising:
a floor;
a first equipment component;
a second equipment component, wherein the door is located between the first equipment component and the second equipment component; and
a partitioning device;
wherein the partitioning device is set up to provide a wall surface between the first equipment component and the second equipment component substantially perpendicular to the floor;
wherein the partitioning device is positionable in at least three positions along a length running between the first equipment component and the second equipment component; and
wherein the partitioning device is lockable in its respective position on at least one of the floor, a cabin ceiling, and a cabin lining, and wherein the partitioning device is configured to be locked in a forwardmost position between the first equipment module and the door and abutting against the first equipment module in a first operating mode, configured to be locked in an intermediate position blocking access to the door in a second operating mode, and configured to be locked in a rearmost position between the second equipment module and the door.

15. The aircraft of claim 14, further comprising a locking mechanism with at least one support foot configured to be extended downward into contact with am uppermost surface of the floor.

16. The aircraft of claim 14, wherein the partitioning device is configured to be locked in any position continuously located between the forwardmost position and the rearmost position.

17. An arrangement for a cabin of a vehicle, comprising:
a floor having a primary region and a secondary region separated by an aisle;
a first equipment component located in the primary region;
a second equipment component located in the primary region; and
a partitioning device located in the primary region and terminating at the aisle;
wherein the partitioning device is set up to provide a wall surface between the first equipment component and the second equipment component substantially perpendicular to the floor;

wherein the partitioning device is positionable in at least two positions along a length running between the first equipment component and the second equipment component;

wherein the at least two positions includes a forwardmost position and a rearmost position, wherein the partitioning device is lockable in its respective position on at least one of the floor, a cabin ceiling, and a cabin lining;

wherein the partitioning device comprises a guiding device and a dimensionally stable partition wall guided therein, and wherein the partitioning device is configured to be locked in position at any location continuously along the length running between the first equipment component and the second equipment component.

18. The arrangement of claim 17 further comprising a locking mechanism with at least one support foot configured to be extended downward into contact with an uppermost surface of the floor to lock the partitioning device in position at any location continuously along the length running between the first equipment component and the second equipment component.

* * * * *